R. H. MANSON.
ELECTRIC SYSTEM FOR VEHICLES.
APPLICATION FILED APR. 18, 1912.
1,131,402.
Patented Mar. 9, 1915.
2 SHEETS—SHEET 1.
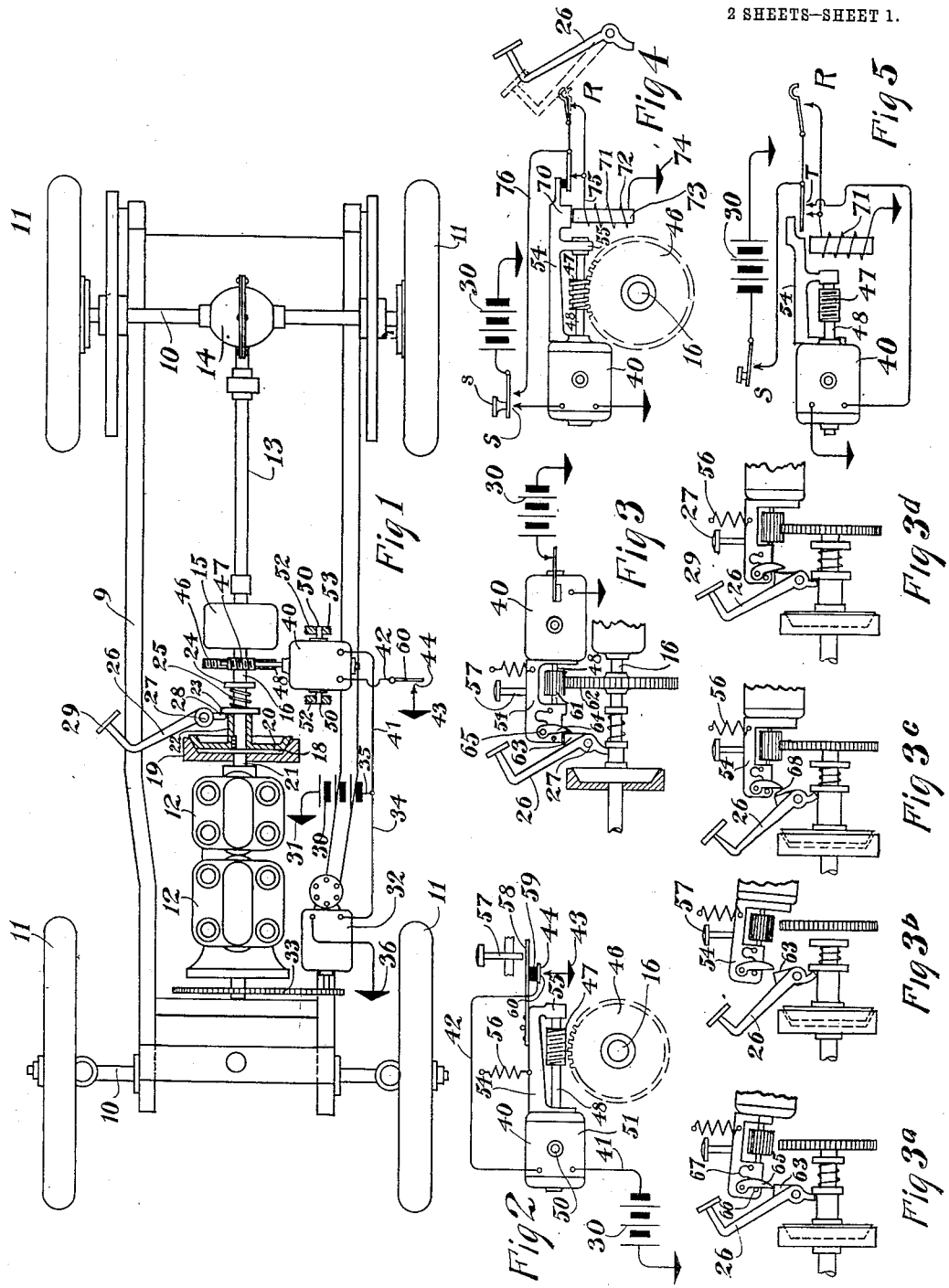
Witnesses
E. A. Spurr
Meta Schmittberger
Inventor
Ray H. Manson
By J. O. Ridley
His Attorney

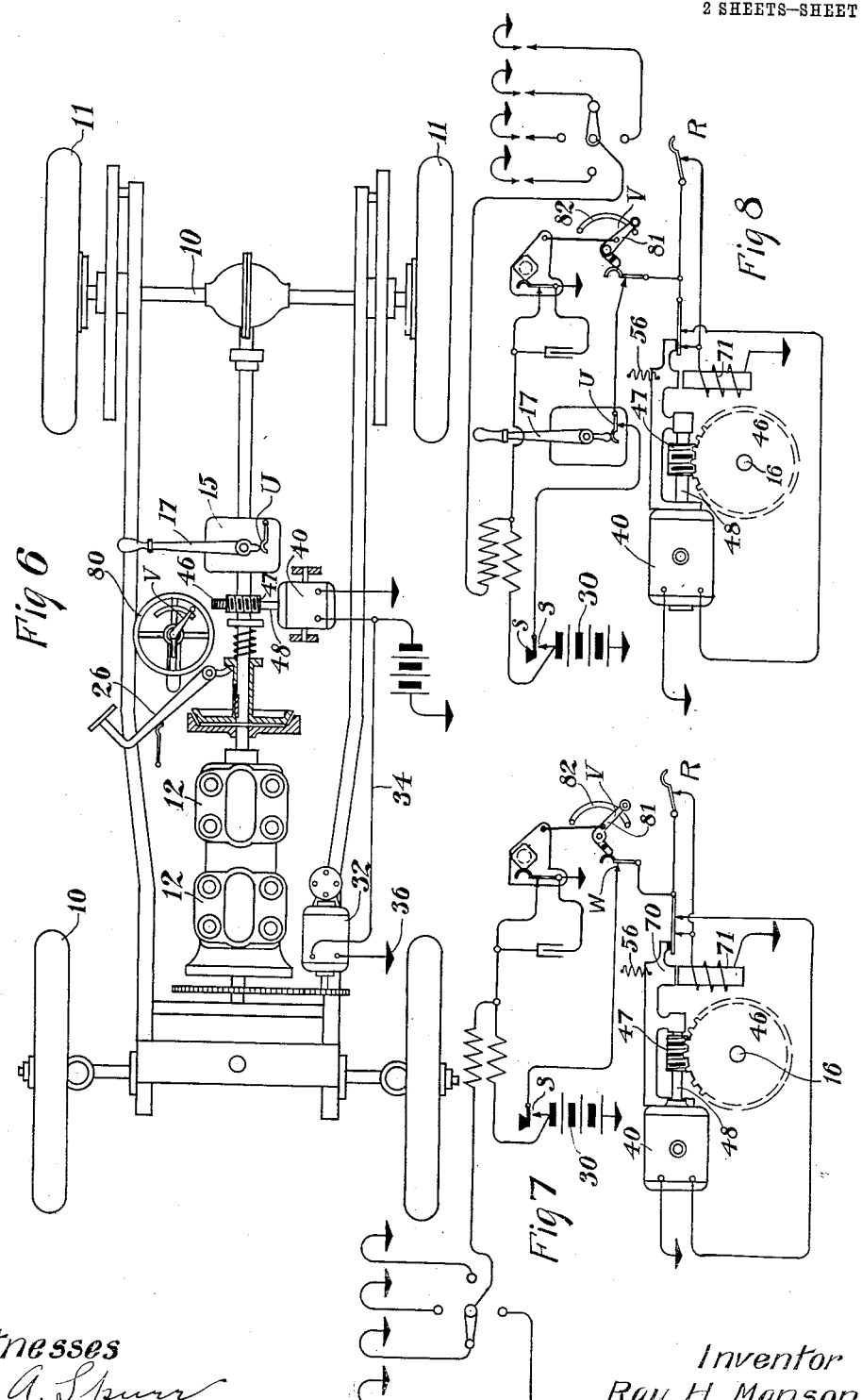

UNITED STATES PATENT OFFICE.

RAY H. MANSON, OF ELYRIA, OHIO, ASSIGNOR TO THE GARFORD MANUFACTURING COMPANY, OF ELYRIA, OHIO, A CORPORATION OF OHIO.

ELECTRIC SYSTEM FOR VEHICLES.

1,131,402.  Specification of Letters Patent.  Patented Mar. 9, 1915.

Application filed April 18, 1912. Serial No. 691,684.

*To all whom it may concern:*

Be it known that I, RAY H. MANSON, a citizen of the United States, residing at Elyria, in the county of Lorain and State of Ohio, have invented certain new and useful Improvements in Electric Systems for Vehicles; and I do hereby declare the following to be a full, clear, and exact description of the invention, such as will enable others skilled in the art to which it appertains to make and use the same.

My invention relates to electric systems for use upon vehicles, such as automobiles and the like, and more particularly to starting systems for the prime mover of the automobile. This prime mover may consist of an explosion engine of any suitable construction. In fact such forms of prime movers are generally employed upon automobiles.

For the purpose of describing my invention and its objects, I have illustrated certain embodiments of the invention in the accompanying drawings. The invention and the objects thereof will be best understood by reference to the particular description of these embodiments when taken in connection with the drawings illustrating them.

This application is a companion to my applications Nos. 688,432, 688,714 and 689,737.

Figure 1 is a plan view of the chassis of an automobile in connection with which I have shown diagrammatically one of the embodiments of my invention. Fig. 2 is a diagram showing more completely the form illustrated in Fig. 1. Fig. 3 is an illustration of another embodiment of my invention adapted to be applied to the chassis shown in Fig. 1. Figs. 3ª, 3ᵇ, 3ᶜ and 3ᵈ are reproductions of the essential parts of Fig. 3, illustrating the operation of the device of Fig. 3. Fig. 4 illustrates another modification. Fig. 5 illustrates a modification of Fig. 4. Fig. 6 is a second illustration of the chassis of an automobile, showing certain parts not illustrated in Fig. 1. Fig. 7 is a diagram of an embodiment of my invention adapted to be applied to the chassis shown in Fig. 6. Fig. 8 is a modification of the embodiment shown in Fig. 7.

Referring now to the drawings and to the embodiments of my invention illustrated therein, at 9 is shown the frame of the chassis of the vehicle, such as an automobile. The running gear, including the axles 10 and the wheels 11 is illustrated as mounted in the frame.

At 12 is shown a prime mover, which is here illustrated as a hydro-carbon engine of the explosion type, and which is adapted when connected to the running gear of the vehicle, to drive the same. These engines are generally incapable of starting themselves, and it has hitherto been the general custom to employ manual means for starting them. Considerable inconvenience and some danger is experienced by this crude method, and I aim to provide mechanical starting means for performing this function.

Suitable means for connecting the engine and running gear are provided, and as illustrated in the drawings, I may employ a drive shaft 13 which is connected by gearing in the gearing box 14 to the rear axles. This shaft is connected by gears 15 to an intermediate member 16 which is employed for transmitting the power and the motion from the engine to the running gear. The gears in the casing 15 are not a part of my invention, and being well known and understood, they are not described here, it being sufficient to say that the prime mover and the transmission shaft 16 may be connected or disconnected to the running gear by this set of gears at the will of the operator, their position being dependent upon a lever 17 shown in Figs. 6 and 8. The prime mover is preferably normally connected to the transmission member 16 through suitable means such as a friction clutch 18, here shown consisting of two members 19 and 20, each provided with a friction surface which surfaces are adapted to be interengaged to connect the engine and the transmission shaft 16. The member 19 is rigidly connected to the engine shaft 21, and the member 20 is slidably keyed upon the shaft 16. This member is connected by a neck 22 to a collar 23. A second collar 24 is fastened upon the shaft 16, and a coil spring 25 wound upon the shaft 16, abuts at either end against the collars 23 and 24 normally pressing the member 20 into engagement with the member 19.

It will be apparent that I may use any suitable mechanism for forcing the two friction members together, and that I may employ any suitable clutching device, but I prefer to use one which will admit of a connection between the engine and the transmission shaft when moving at different speeds without jarring or jerking the parts.

At 26 I show means for controlling the device 18. In the illustration, this means consists of a clutch lever 26 pivoted at 27 and having a tail end 28 engaging the collar 23, so that when the lever is depressed by shoving with the foot upon the pedal 29, the spring 25 will be compressed, the clutch member 20 moved backward, and the engine separated from the transmission shaft and the running gear.

At 30 I show a source of current, such as an accumulator or storage battery having one of its poles grounded at 31. When an accumulator is employed, suitable means for storing energy in this battery are provided. In the form shown, I have illustrated a dynamo electric machine at 32, which is adapted to be driven by the engine 12 through some suitable means, such as sprocket wheels and chain 33. One terminal of this machine is connected by a conductor 34 to the free pole 35 of the accumulator, and the other pole of the dynamo electric machine is grounded at 36. The starting means is shown adjacent the engine, and consists preferably of a starting motor 40 with suitable means for connecting it to the prime mover and to the accumulator 30. One terminal of the motor is connected by a conductor 41 to the storage battery and the other terminal by a conductor 42 to ground at 43 through a switch 44. As here illustrated, the motor is normally disconnected from the engine, but suitable means are provided for making such connection that the motor may start the prime mover. This means may consist of the transmission shaft 16 or its equivalent, and suitable gearing between such shaft and the motor.

In some of the figures I have illustrated a worm gearing and in the others, ordinary spur gearing. For example, in Figs. 1, 2, 4, 6, 7 and 8 I have illustrated a worm gear 46 upon the transmission shaft 16 and a worm 47 upon the shaft 48 of the motor 40.

I have here illustrated the motor as movable to complete the connection of the gear. Trunnions 50 may be mounted upon the motor casing 51 and engage the bearings 52 in the frame piece 53. When thus mounted, the motor will be movable upon the pivots formed by the trunnions and bearings for the purpose of connecting and disconnecting the gears. I prefer to employ an arm 54 upon the motor casing in which one end of the armature shaft is journaled as shown at 55. The gears are normally prevented from engaging each other by some suitable means, such as a spring 56 connected at one end to some part of the motor, such as the arm 54, and at the other end to the frame of the vehicle or any suitable anchoring means.

At 57 I show a device which in the form illustrated in Figs. 1, 2 and 3 consists of a foot pedal for depressing the arm 54, and causing the gears to engage to connect the motor to the prime mover. I may also control the circuit of the motor by the device 57 through the switch 44 or other suitable mechanism, and for this purpose I have shown a spring 58 mounted upon the arm 54, which spring carries an insulating member 59 to which is attached one of the contacts 60 of the switch 44.

I will now describe the form of my invention illustrated in Figs. 1 and 2 to better illustrate the invention and its objects. When it is desired to start the prime mover, the lever 26 should be operated to disconnect the engine from the transmission member 16, and the lever 17 operated to disconnect the transmission means from the running gear. The pedal 57 is then depressed, which through the arm 54, will cause the gears 46 and 47 to engage, and through the spring 58, close the switch 44, completing a circuit through the motor and accumulator 30. These two operations may take place at the same time, so that the motor will begin to operate as soon as the gears engage, though I prefer to start the motor slightly before it is connected up that it may gain some headway before engaging the transmission means. The motor then starts the transmission means, and when it is well under way, the clutch 18 is released and the engine connected to the member 16, whereupon it is started by the motor. If preferred, however, the engine may be started directly from the motor, and without disconnecting it from the transmission means, though I prefer to operate it as first described. It will also be understood that the switch 44 may be controlled by independent means.

Referring now to Figs. 3, 3ᵃ, 3ᵇ, 3ᶜ and 3ᵈ where I have shown means to prevent the connection of the motor to the transmission means while the same is connected to the engine, I have illustrated spur gearing 61 and 62 mounted upon the armature shaft 48 and the transmission shaft 16 respectively. The device 26 is here provided with an obstruction member 63 which may be a simple lug, and the arm 54 or other suitable part of the motor, is provided with a second obstruction member 64 which may preferably consist of a pendant member pivoted at 65 to the arm. The parts are normally in the position shown in Fig. 3ᵃ, the member 65 engaging the lug 63 and preventing the connection of the motor to the transmission shaft when the engine is connected thereto. The member 65 is held in its normal position by an abutment 66 against which it is pressed by a spring 67. The lug 63 is moved out of the path of the member 65 when the device 26 is depressed as shown in Fig. 3$^b$. The arm 54 is then depressed through the member 57, as shown in Fig. 3$^c$, the projecting edges 68 on the member 26 moving the member 65 out of the path of the lug, so that when it is desired to clutch in the engine, these members will no longer interfere and the engine can be connected to the motor. I thus provide means for preventing the connection of the motor to the transmission shaft at the time the engine is connected thereto, though as will be seen, both the engine and the motor may be connected during the same period of time to the transmission shaft. This prevents the wasteful consumption of energy which results from an effort to start the engine directly with the motor. After the engine is started, the pedal 57 is relieved, whereupon the spring 56 disconnects the gearing, and the engine operates independently of the motor.

In the modification shown in Fig. 4, I have provided remotely controlled means, such as electric means for performing some of the parts of the operation. An armature 70 is either formed or fastened onto the arm 54 and electrically controlled means, such as an electromagnet 71 is provided. This magnet consists of a coil 72 wound upon a suitable core 73. One terminal of the magnet is here shown grounded at 74 and the other terminal connected to a conductor 75, which is connected through a conductor 76 to one terminal of a switch S. Two switches T and R are connected preferably in multiple in the circuit of the electromagnet, one of them being controlled by the magnet and the other by the member 26. The operation of this apparatus is briefly as follows: When in normal condition, all the switches S, T, and R are open. It will be seen that the motor cannot be connected to the engine until the circuit of the magnet is closed, and, therefore, cannot be connected to the engine when the engine is connected to the running gear. The lever 26 is depressed to the dotted line position, releasing the clutch 18 and closing the switch R. The operator then depresses the button $s$, closing a circuit from the battery 30 through the switch S, conductor 76, switch R and the electromagnet. This energizes the magnet which attracts its armature 70, pulling down the arm 54 and causing the gear wheels to mesh, so that the motor is connected with the transmission device 16. At the same time, the magnet closes the switch T and a locking circuit through this switch, which releases the magnet from the control of the member 26, since the switch R is shunted. The magnet will now hold the arm 24 in the position shown in the drawing after the clutch is released. The switch S also controls the motor circuit, as will be apparent from this figure, and when depressed, will close such circuit, preferably simultaneously with the circuit of the magnet 71. When the switch S is released, the circuit of the magnet will be opened, and the parts will be restored to normal.

In Fig. 5 I show a modification by which the motor cannot be started until it is connected to the transmission apparatus. Here the circuit of the motor is controlled by the magnet. When the switches S and R are closed, the magnet will be energized, completing a locking circuit and connecting the motor to the transmission member as before and by the same operation and preferably at the same time, closing the circuit of the motor.

In Fig. 6 I show a steering device 80, and a switch V which is here shown mounted upon the steering device. I also show a switch U which will be described later.

In Fig. 7 I show an embodiment of my invention in which the starting device is controlled by engine controlling means. For example, in internal combustion engines, spark producing means is employed for igniting the charge. This generally consists of an electric spark and electric means including a circuit is employed for producing this spark. Before the engine can be started, it is necessary to condition this circuit, so that the sparks can be produced at the desired time and with the desired frequencies. Ordinarily these circuit connections are controlled by a device which is mounted upon the steering device V. It some times happens that the operator will forget to condition this circuit by the proper manipulation of the device V, and will endeavor to start his engine, which, as will readily be seen, will be impossible. For example, under one condition of the ignition circuits there is no danger of the engine back firing and injuring the starting apparatus. I may connect the device V in the circuit in such a way that it will be impossible to start the engine when there is danger of this character.

In Fig. 7 the circuit of the electromagnet 70 is controlled by the device V, and in the form shown, this is accomplished through a switch W. It will be seen that it will be necessary to close the switch R by depressing the member 26, which releases the clutch 18, shifting the arm 81 to its proper position and operating the switch S. When this is done, the magnet will be energized, and will attract its armature 70, completing a locking circuit through the magnet independently of the member 26 and switch R, and likewise a circuit through the motor 40. As will be seen, it will be necessary that the parts 81 and 82 retain a certain relation to one another during the starting, for if they are moved, the circuit of the motor will be opened.

In the form shown in Fig. 8, the circuit of both the motor and of the means for connecting the motor to the engine are controlled by the mechanism which governs the connection of the transmission means to the running gear. In the form shown, this is accomplished through the switch U, which may be placed in the circuits of both the magnet 71 and the motor 40. In order to connect the motor to the gear 46, it is necessary to close the switches R, W, U and S. In other words, the operator must disconnect the transmission means from the running gear which prevents the motor from driving the running gear, must condition his engine controlling means, so that the engine will be operative, must disconnect the transmission means from the engine and operate the switch S before he can connect the motor to the transmission means, and when these things are done, the motor will be connected automatically to the transmission means independently of the member 26 and can be released by the operation of either the device 17, V, or by releasing the button s.

In Figs. 7 and 8 I have illustrated well known forms of ignition circuits, though I do not wish to be limited to the use of either one, since my invention is capable of being used with any of the well known forms of ignition circuits. I may likewise employ my invention with any well known form of vehicle and with any suitable form of engine. The various clutches, gearing and controlling means thereof admit of variation; likewise any form of motor or dynamo suitable for the purpose of my invention may be employed. In fact, I contemplate numerous and extensive departures from the forms and details of the apparatus here shown without departing from the spirit of my invention, which has been illustrated in these particular embodiments merely for the purpose of illustrating the invention.

I claim:—

1. In combination with the running gear of a vehicle, a prime mover normally connected thereto, a lever controlling the connection of said prime mover and running gear, a lug on said lever, a starting motor, means for connecting said motor to said prime mover, a movable member on said last named means adapted to engage the lug on the lever to prevent the connection of said motor to said prime mover when said prime mover is connected to said running gear and means to move said movable member out of the path of said lug when said lever is reciprocated whereby said starting motor may be connected to said prime mover.

2. In combination with the running gear of a vehicle, steering means therefor, a prime mover adapted to drive said running gear, means on said steering means controlling the operation of said prime mover, and a starting motor for said prime mover controlled by said prime mover controlling means, said starting motor being normally disconnected from said prime mover.

3. In combination with the running gear of a vehicle, steering means therefor, a prime mover adapted to drive said running gear, a spark control device on said steering wheel controlling the operation of said prime mover, and a starting motor for said prime mover controlled by said spark control device, said starting motor being normally disconnected from said prime mover.

4. In combination with the running gear of a vehicle, a steering wheel therefor, a prime mover adapted to drive said running gear, a spark control lever on said wheel controlling the operation of said prime mover, a starting motor for said prime mover normally disconnected therefrom, and means controlled by said lever for connecting said starting motor to said prime mover.

5. In combination with the running gear of a vehicle, a prime mover, means to connect said prime mover to said running gear, a starting motor normally disconnected from said prime mover but adapted to be connected thereto through said means, and means controlling the operation of the prime mover and the starting motor.

6. In combination with the running gear of a vehicle, of a prime mover adapted to operate the same, means to connect said prime mover to said running gear, a starting motor normally disconnected from said prime mover, but adapted to be connected thereto through said means, connecting means to connect said starting motor to said first named means and means controlling the operation of said prime mover, and said connecting means.

7. In combination with the running gear of a vehicle, a prime mover, means for connecting said prime mover to said running gear, a starting motor normally disconnected from said prime mover, but adapted to be connected thereto and common means controlling the connection of said starting motor to said prime mover and the connection of said prime mover to said running gear.

8. In combination with the running gear of a vehicle, a prime mover, means for connecting said prime mover to said running gear, a starting motor normally disconnected from said prime mover, but adapted to be connected thereto, an electromagnet controlling the connection of the motor to the prime mover and common means controlling said magnet and said first named means.

9. In combination with the running gear of a vehicle, a prime mover adapted to be connected thereto, a movable motor for starting said prime mover, a circuit for said motor, means for connecting said motor to said prime mover, and means for moving said motor to close said circuit and operate said connecting means.

10. In combination with the running gear of a vehicle, a prime mover adapted to be connected thereto, a movable motor for starting said prime mover, and a circuit for said motor, said motor adapted to be moved to connect it with said prime mover and to close said circuit.

11. In combination with the running gear of a vehicle, a prime mover adapted to be connected thereto, a pivoted starting motor for starting said prime mover, and a circuit for said motor, said motor adapted to be rotated upon its pivots to be connected to said prime mover and to close said circuit.

12. In combination with the running gear of a vehicle, a prime mover adapted to be connected thereto, a pivoted starting motor for starting said prime mover, means for connecting said motor to said prime mover, a circuit for said motor, and means for rotating said motor upon its pivots to operate said connecting means and to close said circuit.

13. In combination with the running gear of a vehicle, of a prime mover, a starting motor, a switch, a storage battery, circuit connections for connecting said motor switch and storage battery, means normally disconnected from the running gear for transmitting motion from said prime mover to the running gear, and means for simultaneously operating said switch and placing said motor in engagement with said motion transmitting means.

14. In combination with the running gear of a vehicle, of a prime mover, a movable starting motor, a switch, a storage battery, circuit connections for connecting said motor, switch and storage battery, and means for transmitting motion from said prime mover to the running gear, said motor being movable to simultaneously operate said switch, and place said motor in engagement with said motion transmission means.

15. In combination with the running gear of a vehicle, of a prime mover, a movable starting motor, a switch, a storage battery, circuit connections for connecting said motor, switch and storage battery, means for transmitting motion from said prime mover to the running gear, and means for moving said motor to simultaneously operate said switch and place said motor in engagement with said motion transmission means.

16. In combination with the running gear of a vehicle, of a prime mover, a pivoted starting motor, a switch, a storage battery, circuit connections for connecting said motor, switch and storage battery, and means for transmitting motion from said prime mover to the running gear, said motor being movable upon its pivot to simultaneously operate said switch and place said motor in engagement with said motion transmission means.

17. In combination with the running gear of a vehicle, of a prime mover, a pivoted starting motor, a switch, a storage battery, circuit connections for connecting said motor, switch and storage battery, means for transmitting motion from said prime mover to the running gear, and means for moving said motor upon its pivot to simultaneously operate said switch and place said motor in engagement with said motion transmission means.

18. In combination with the running gear of a vehicle, a prime mover adapted to be connected thereto, means for transmitting motion from said prime mover to said running gear, a starting motor adapted to be connected to said transmission means, and means to prevent the connection of said motor to said transmission means when said motor is at rest and said transmission means is connected to said prime mover.

19. In combination with the running gear of a vehicle, a prime mover adapted to be connected thereto, means for transmitting motion from said prime mover to said running gear, a starting motor adapted to be connected to said transmission means, and mechanical means to prevent the connection of said motor to said transmission means when said motor is at rest and transmission means is connected to said prime mover.

20. In combination with the running gear of a vehicle, a prime mover adapted to be connected thereto, means to transmit motion from said prime mover to said running gear, said means being normally connected to said prime mover, means for disconnecting said transmission means and said prime mover, a starting motor for said prime mover, and means to prevent the connection of said motor to said prime mover until after said disconnecting means has been operated.

21. In combination with the running gear of a vehicle, a prime mover adapted to be connected thereto, means to transmit motion from said prime mover to said running gear, said means being normally connected to said prime mover, means for disconnecting said transmission means and said prime mover, a starting motor for said prime mover, means to prevent the connection of said motor to said prime mover until after said disconnecting means has been operated, and means to connect said motor to said prime mover after said disconnecting means is operated.

22. In combination with the running gear of a vehicle, a prime mover adapted to be connected thereto, means for transmitting motion from said prime mover to said running gear, a starting motor adapted to be connected to said transmission means, means to prevent the connection of said motor to said transmission means until after said disconnecting means is operated, and means to connect said motor to said prime mover after said disconnecting means is operated.

23. In combination with the running gear of a vehicle, a prime mover, adapted to be connected thereto, means to transmit motion from said prime mover to said running gear, said means being normally connected to said prime mover, a lever for disconnecting said transmission means and said prime mover, a starting motor for said prime mover, and means including a member on said lever for preventing the connection of said motor to said prime mover until said lever is operated.

24. In combination with the running gear of a vehicle, a prime mover adapted to be connected thereto, means to transmit motion from said prime mover to said running gear, said means being normally connected to said prime mover, a lever for disconnecting said transmission means and said prime mover, a starting motor for said prime mover, and means including a lug on said lever for preventing the connection of said motor to said prime mover until said lever is operated.

25. In combination with the running gear of a vehicle, a prime mover adapted to be connected thereto, means to transmit motion from said prime mover to said running gear, said means being normally connected to said prime mover, a lever for disconnecting said transmission means and said prime mover, a starting motor for said prime mover, means for connecting said starting motor to said transmission means, a member on said lever, and a member on said connecting means preventing the connection of said motor to said transmission means until said lever is operated.

26. In combination with the running gear of a vehicle, a prime mover adapted to be connected thereto, means to transmit motion from said prime mover to said running gear, said means being normally connected to said prime mover, a lever for disconnecting said transmission means and said prime mover, a starting motor for said prime mover, means for connecting said starting motor to said transmission means, a lug on said lever and a pendant member on said connecting means preventing the connection of said motor to said transmission means until said lever is operated.

27. In combination with the running gear of a vehicle, a prime mover normally connected thereto, means for connecting said prime mover and said running gear, a lever controlling said means, a lug on said lever, a starting motor, means for connecting said motor to said first named means, a movable member on said last named means adapted to engage the lug on the lever to prevent the connection of said motor to said prime mover when said prime mover is connected to said running gear, and means to move said movable member out of the path of said lug when said lever is reciprocated whereby said starting motor may be connected to said prime mover.

28. In combination with the running gear of a vehicle, a prime mover normally connected thereto, means for connecting said prime mover and said running gear, a lever controlling said means, a lug on said lever, a starting motor, means for connecting said motor to said first named means, a movable member on said last named means adapted to engage the lug on the lever to prevent the connection of said motor to said prime mover when said prime mover is connected to said running gear, and a projection on said lever to move said movable member out of the path of said lug when said lever is reciprocated whereby said starting motor may be connected to said prime mover.

29. In combination with the running gear of a vehicle, a prime mover normally connected thereto, means for connecting said prime mover and said running gear, a lever controlling said means, a lug on said lever, a starting motor, means for connecting said motor to said first named means, and a movable member on said last named means adapted to engage the lug on the lever to prevent the connection of said motor to said prime mover when said prime mover is connected to said running gear, said lug being moved from the path of the movable member when said lever is operated.

30. In combination with the running gear of a vehicle, of a prime mover normally connected thereto, a starting motor for starting said prime mover, a member preventing the connection of said motor to said prime mover, and a device for removing said member and for disconnecting said prime mover from said running gear.

31. In combination with the running gear of a vehicle, of a prime mover normally connected thereto, a starting motor for starting said prime mover, a member preventing the connection of said motor to said prime mover, and a lever for removing said member and for disconnecting said prime mover from said running gear.

32. In combination with the running gear of a vehicle, of a prime mover normally connected thereto, a starting motor for starting said prime mover, a lug preventing the connection of said motor to said prime mover, and a device for removing said lug, and for disconnecting said prime mover from said running gear.

33. In combination with the running gear of a vehicle, a prime mover normally connected thereto, a starting motor for said prime mover, means for connecting said motor to said prime mover, a lever for disconnecting said prime mover from said running gear, and a lug on said lever normally in the path of said connecting means and operating to prevent the connection of the motor to the prime mover, said lever being operable to simultaneously disconnect said prime mover from said running gear and remove said lug from the path of said connecting means.

34. In combination with the running gear of a vehicle, a prime mover, a starting motor, means to connect said motor to said prime mover, a pivoted member on said means, a lug in the path of movement of said member preventing the connection of said motor to said prime mover, and means for moving said lug from the path of said member.

35. In combination with the running gear of a vehicle, a prime mover, a starting motor, means to connect said motor to said prime mover, a pivoted member on said means, a lug in the path of movement of said member preventing the connection of said motor to said prime mover, means for moving said lug from the path of said member, and means for moving said member from the path of said lug.

36. In combination with the running gear of a vehicle, a prime mover adapted to be connected thereto, a motor adapted to be connected to said prime mover, a pair of movable members preventing the connection of said motor to said prime mover, each member being movable out of the path of the other to permit the connection of said motor to said prime mover.

37. In combination with the running gear of a vehicle, of a prime mover, means for transmitting motion from said prime mover to said running gear, a starting motor adapted to be connected to said transmission means, and electrical means preventing the connection of said motor to said transmission means until after said transmission means is disconnected from said motor.

38. In combination with the running gear of a vehicle, of a prime mover, means for transmitting motion from said prime mover to said running gear, a starting motor adapted to be connected to said transmission means, electrical means preventing the connection of said motor to said transmission means until after said transmission means is disconnected from said prime mover, and means for rendering ineffective said preventing means after said motor has been connected to the prime mover.

39. In combination with the running gear of a vehicle of a prime mover adapted to operate the same, a clutch for connecting said prime mover to the running gear, a starting motor normally disconnected from said prime mover, but adapted to be connected thereto and common means controlling said clutch and the connection of said starting motor to said prime mover.

40. In combination with the running gear of a vehicle of a prime mover adapted to operate the same, a clutch for connecting said prime mover to the running gear, a starting motor normally disconnected from said prime mover, but adapted to be connected thereto, electrically operated means controlling the connection of said motor to said prime mover and common means controlling said clutch and said electrically operated means.

41. In combination with the running gear of a vehicle, of a prime mover adapted to operate the same, a clutch for connecting said prime mover to the running gear of the vehicle, a starting motor normally disconnected from said prime mover but adapted to be connected thereto, and a lever controlling said clutch and the connection of said starting motor to said prime mover.

42. In combination with the running gear of a vehicle, of a prime mover adapted to operate the same, a clutch for connecting said prime mover to the running gear of the vehicle, a movable starting motor normally disconnected from said prime mover, but adapted to be moved to complete a connection between said motor and said prime mover, and common means controlling said clutch and the moving of said motor.

43. In combination with the running gear of a vehicle, of a prime mover adapted to operate the same, means for connecting said prime mover to the running gear of the vehicle, a movable starting motor normally disconnected from said prime mover but adapted to be moved to be connected thereto and common means controlling said first named means and the movement of said motor to connect it with the prime mover.

44. In combination with the running gear of a vehicle, of a prime mover adapted to operate the same, a clutch for connecting said prime mover to the running gear of the vehicle, a pivoted starting motor normally disconnected from said prime mover but adapted to be moved upon its pivot for connecting it thereto, electrically operated means for moving said motor and a lever controlling said clutch and said electrically operated means.

45. In combination with the running gear of a vehicle, of a prime mover, means for connecting said prime mover to said running gear, controlling means for said last named means, a starting motor, and means controlled by said controlling means for connecting said motor to said connecting means.

46. In combination with the running gear of a vehicle, of a prime mover, means for connecting said prime mover to said running gear, controlling means for said last named means, a starting motor, and electrical means controlled by said controlling means for connecting said motor to said connecting means.

47. In combination with the running gear of a vehicle, of a prime mover, means for connecting said prime mover to said running gear, operating means for said last named means, a starting motor, and electrically operated means controlled by said operating means for connecting said motor to said connecting means.

48. In combination with the running gear of a vehicle, a prime mover, means for transmitting power from said prime mover to said running gear, a starting motor adapted to be connected to said prime mover, means including an electro-magnet for connecting said motor to said prime mover, and means controlling the said magnet and the connection of said prime mover to said transmitting means.

49. In combination with the running gear of a vehicle, of a prime mover, means for transmitting power from said prime mover to said running gear, a starting motor adapted to be connected to said prime mover, means including an electro-magnet for connecting said motor to said prime mover, means controlling said magnet and the connection of said transmission means to said prime mover, and means to remove said magnet from the control of said controlling means.

50. In combination with the running gear of a vehicle, a prime mover, means for transmitting power from said prime mover to said running gear, a starting motor adapted to be connected to said prime mover, means including an electro-magnet for connecting said motor to said prime mover, and means controlling the circuit of said magnet and the connection of said transmission means to said prime mover.

51. In combination with the running gear of a vehicle, a prime mover, means for transmitting power from said prime mover to said running gear, a starting motor adapted to be connected to said prime mover, means including an electro-magnet for connecting said motor to said prime mover, means controlling the circuit of said magnet and the connection of said transmission means to said prime mover, and a locking circuit for removing said magnet from the control of said controlling means.

52. In combination with the running gear of a vehicle, a prime mover adapted to be connected thereto, a member intermediate the two, a starting motor adapted to be connected to said member to start the same, means to connect said intermediate member to said prime mover, and a controlling device for said connecting means controlling the operation of said motor.

53. In combination with the running gear of a vehicle, a prime mover adapted to be connected thereto, a member intermediate the two, a starting motor adapted to be connected to said member to start the same, a circuit for said motor, means to connect said intermediate member to said prime mover, and a controlling device for said connecting means controlling the circuit of said motor.

54. In combination with the running gear of a vehicle, a prime mover adapted to be connected thereto, means for transmitting motion from said prime mover to said running gear, a device controlling said means, a starting motor for said prime mover, a magnet for connecting said motor to said transmission means, a circuit for said magnet, a switch in said circuit controlled by said device, and a second switch in said circuit controlled by said magnet.

55. In combination with the running gear of a vehicle, of a prime mover adapted to be connected thereto, an intermediate member for transmitting motion from said prime mover to said running gear, said member adapted to be connected to and disconnected from said prime mover, mechanism for connecting said prime mover to said member, a starting motor, means to connect said starting motor to said prime mover, and a plurality of means controlling said connecting means one of which controls said mechanism.

56. In combination with the running gear of a vehicle, a prime mover, an intermediate member for connecting said prime mover to said running gear, means for connecting said prime mover to said running gear, means for connecting said prime mover and intermediate member, a device controlling said connecting means, a starting motor, electro-magnetic means for connecting said starting motor to said intermediate member, a circuit therefor, and means for preventing the completion of the circuit through said electro-magnetic means until said device is operated.

57. In combination with the running gear of a vehicle, of a prime mover, a gear and a gear shift device for connecting said prime mover to said running gear, a starting motor for said prime mover normally disconnected therefrom, but adapted to be connected thereto, and means controlling the connection of said motor to said prime mover controlled by said gear shift device.

58. In combination with the running gear of a vehicle, a prime mover adapted to be connected thereto, a movable starting motor for said prime mover normally disconnected therefrom, an accumulator, circuit connections for transmitting electricity from said accumulator to said prime mover, and common means for moving said motor to connect it to said prime mover and controlling said circuit connections.

59. In combination with the running gear of a vehicle, a prime mover adapted to be connected thereto, a movable starting motor for said prime mover normally disconnected therefrom, means to connect said motor to said prime mover, an accumulator, and common electrical means for moving said motor and operating said connecting means and connecting said starting motor to said accumulator.

60. In combination with the running gear of a vehicle, a prime mover adapted to be connected thereto, a starting motor for said prime mover normally disconnected therefrom, means to connect said motor to said prime mover, an accumulator, and an electro-magnet for simultaneously connecting said starting motor to said accumulator and operating said means connecting said motor to said prime mover.

61. In combination with the running gear of a vehicle, a prime mover adapted to be connected thereto, a starting motor for said prime mover normally disconnected therefrom, means to connect said motor to said prime mover, an accumulator, an electromagnet controlling the connection of said starting motor to said prime mover, a circuit for connecting said motor to said accumulator, and a switch in said circuit controlled by said magnet.

62. In combination with the running gear of a vehicle, a prime mover, transmission means for connecting said prime mover to said running gear, mechanism for connecting said prime mover and said transmission means, a starting motor adapted to be connected to said prime mover, an accumulator, electrical means controlling the connection of said motor to said prime mover, and a circuit for connecting said motor to said accumulator controlled by said electrical means and said mechanism.

63. In combination with the running gear of a vehicle, a prime mover, transmission means for connecting said prime mover to said running gear, mechanism for connecting said prime mover and said transmission means, a starting motor adapted to be connected to said prime mover, an accumulator, electrical means controlling the connection of said motor to said prime mover, a manually operable switch, and a circuit for connecting said motor to said accumulator controlled by said electrical means, said switch and said mechanism.

64. In combination with the running gear of a vehicle, a prime mover therefor, transmission means for connecting said prime mover and said running gear, mechanism for connecting said prime mover to said transmission means, controlling means for said prime mover, a starting motor for said prime mover, an accumulator, a switch, and means for connecting said starting motor to said prime mover controlled by said switch, said mechanism and said controlling means for said prime mover.

65. In combination with the running gear of a vehicle, a prime mover therefor, transmission means for connecting said prime mover and said running gear, mechanism for connecting said prime mover to said transmission means, controlling means for said prime mover, a starting motor for said prime mover, an accumulator, a switch, means for connecting said starting motor to said prime mover, a magnet controlling the connection of said motor to said prime mover, and a circuit therefor, said circuit being controlled by said switch, said mechanism and said prime mover controlling means.

66. In combination with the running gear of a vehicle, of a prime mover, transmission means for connecting said prime mover to said running gear, mechanism for connecting said prime mover to said transmission means, means controlling the operation of said prime mover, a starting motor for said prime mover, and means for connecting said starting motor to said prime mover, said last named means being controlled by said mechanism and said prime mover controlling means.

67. In combination with the running gear of a vehicle, a prime mover, transmission means for connecting said prime mover to said running gear, mechanism for connecting said prime mover to said transmission means, means controlling the operation of said prime mover, and a starting motor for said prime mover, said starting motor being controlled by said prime mover controlling means and said mechanism.

68. In combination with the running gear of a vehicle, a prime mover therefor, transmission means for connecting said prime mover and said running gear, mechanism for connecting said prime mover to said transmission means, controlling means for said prime mover, a starting motor for said prime mover, an accumulator, a switch, means for connecting said starting motor to said prime mover, a magnet controlling the connection of said motor to said prime mover, and a circuit therefor, said circuit being controlled by said switch and said mechanism.

69. In combination with the running gear of a vehicle, a prime mover adapted to be connected thereto, means controlling the operation of said prime mover, and a movable starting motor for said prime mover controlled by said prime mover controlling means, said starting motor being normally disconnected from said prime mover.

70. In combination with the running gear of a vehicle, a prime mover therefor, means controlling the operation of said prime mover, a movable starting motor for starting said prime mover, and means for connecting said starting motor to said prime mover, said last named means being controlled by said prime mover controlling means.

71. In combination with the running gear of a vehicle, of a prime mover adapted to be connected thereto, a device controlling the connection of said prime mover to said running gear, means controlling the operation of said prime mover, and a starting motor for said prime mover controlled by said device and said prime mover controlling means.

72. In combination with the running gear of a vehicle, of a prime mover adapted to be connected thereto, a device controlling the connection of said prime mover to said running gear, means controlling the operation of said prime mover, and a starting motor for said prime mover normally disconnected therefrom, said starting motor being controlled by said device.

73. In combination with the running gear of a vehicle, a prime mover, transmission means for connecting said prime mover and said running gear, mechanism for connecting said transmission means to said prime mover, means for connecting said transmission means to said running gear, means controlling the operation of said prime mover, and a starting motor for starting said prime mover controlled by said means, said mechanism and said connecting means.

74. In combination with the running gear of a vehicle, a prime mover, transmission means for connecting said prime mover and said running gear, mechanism for connecting said transmission means to said prime mover, means for connecting said transmission means to said running gear, and a starting motor for said prime mover controlled by said mechanism and said connecting means.

75. In combination with the running gear of a vehicle, a prime mover, transmission means for connecting said prime mover and said running gear, means for connecting said transmission means to said running gear, electrical means controlling the operation of said prime mover, and a starting motor for said prime mover controlled by said electrical means and said connecting means.

76. In combination with the running gear of a vehicle, a prime mover, transmission means for connecting said prime mover and said running gear, mechanism for connecting said transmission means and said prime mover, means for connecting said transmission means to said running gear, electrical means controlling the operation of said prime mover, a starting motor for starting said prime mover, and means for controlling the connection of said prime mover to said motor, said last named means being controlled by said electrical means, said mechanism and said connecting means.

77. In combination with the running gear of a vehicle, a prime mover, transmission means for connecting said prime mover and said running gear, mechanism for connecting said transmission means and said prime mover, means for connecting said transmission means to said running gear, a starting motor for starting said prime mover, and means controlling the connection of said motor to said prime mover, said last named means being controlled by said mechanism and said connecting means.

78. In combination with the running gear of a vehicle, a prime mover, mechanism for connecting said prime mover to said running gear, electrical means controlling the operation of said prime mover, a starting motor for starting said prime mover, and controlling means controlling the connection of said prime mover to said motor, said last named means being controlled by said mechanism and said electrical means.

79. In combination with the running gear of a vehicle, a prime mover, transmission means for connecting said prime mover to said running gear, mechanism for connecting said transmission means to said running gear, a starting motor for said prime mover, and means controlling the connection of said starting motor to said prime mover, said last named means being controlled by said mechanism.

80. In combination with the running gear of a vehicle, a prime mover, mechanism for connecting said prime mover to said running gear, a starting motor normally disconnected from said prime mover but adapted to be connected thereto, means for connecting said motor to said prime mover, means to prevent the connection of said motor to said prime mover when the prime mover is connected to the running gear, and means for disconnecting said motor from said prime mover when said connecting means is released.

81. In combination with the running gear of a vehicle, a prime mover normally connected thereto, a starting motor for starting said prime mover, a member preventing the connection of said motor to said prime mover, a lever for removing said member and for disconnecting said prime mover from said running gear, means for connecting said motor to said prime mover, and means for disconnecting said motor when said connecting means is released.

82. In combination with the running gear of a vehicle, a prime mover, gears and a gear shift device controlling the connection of said prime mover to said running gear, a starting motor for said prime mover normally disconnected therefrom and means controlled by said gear shift device controlling said last named means.

83. In combination with the running gear of a vehicle, of a prime mover, a plurality of gears and a gear shift lever controlling said gears for connecting said prime mover to said running gear at different ratios, a movable starting motor for said prime mover normally disconnected therefrom and means controlled by said gear shift lever for connecting said starting motor to said prime mover.

84. In combination with the running gear of a vehicle, of a prime mover, a plurality of gears and a gear shift lever controlling the same for connecting the prime mover to the running gear at different ratios of speed, a starting motor for said prime mover normally disconnected therefrom and electrically operated means controlled by said gear shift lever controlling the connection of said starting motor to said prime mover.

In testimony whereof, I affix my signature in the presence of two witnesses.

RAY H. MANSON.

Witnesses:
 EDGAR A. SPURR,
 F. O. RICHEY.